(No Model.) 6 Sheets—Sheet 1.

W. J. FOX.
MACHINE FOR MOLDING CIGARS.

No. 321,592. Patented July 7, 1885.

Witnesses
Edward T. Roche
James R. Bowen

Inventor
William J. Fox,
by his attorneys
Gifford & Brown (No Model.)

W. J. FOX.
MACHINE FOR MOLDING CIGARS.

No. 321,592. Patented July 7, 1885.

Witnesses
Edward J. Roche
James R. Bowen

Inventor
William J. Fox,
by his Attorneys,
Gifford & Brown (No Model.) 6 Sheets—Sheet 4.

W. J. FOX.
MACHINE FOR MOLDING CIGARS.

No. 321,592. Patented July 7, 1885.

Witnesses
E. J. Roche
James R. Bowen

Inventor
William J. Fox
by his attorneys
Gifford & Brown (No Model.) 6 Sheets—Sheet 5.
W. J. FOX.
MACHINE FOR MOLDING CIGARS.
No. 321,592. Patented July 7, 1885.
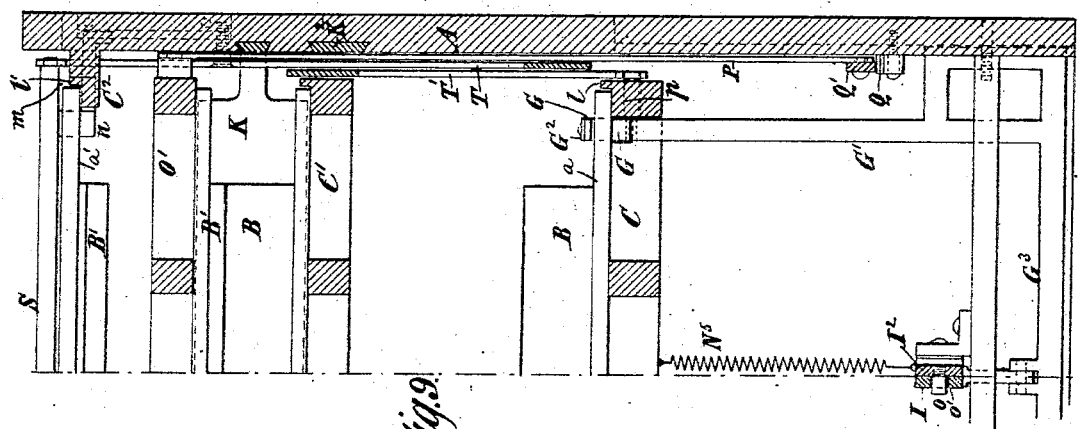
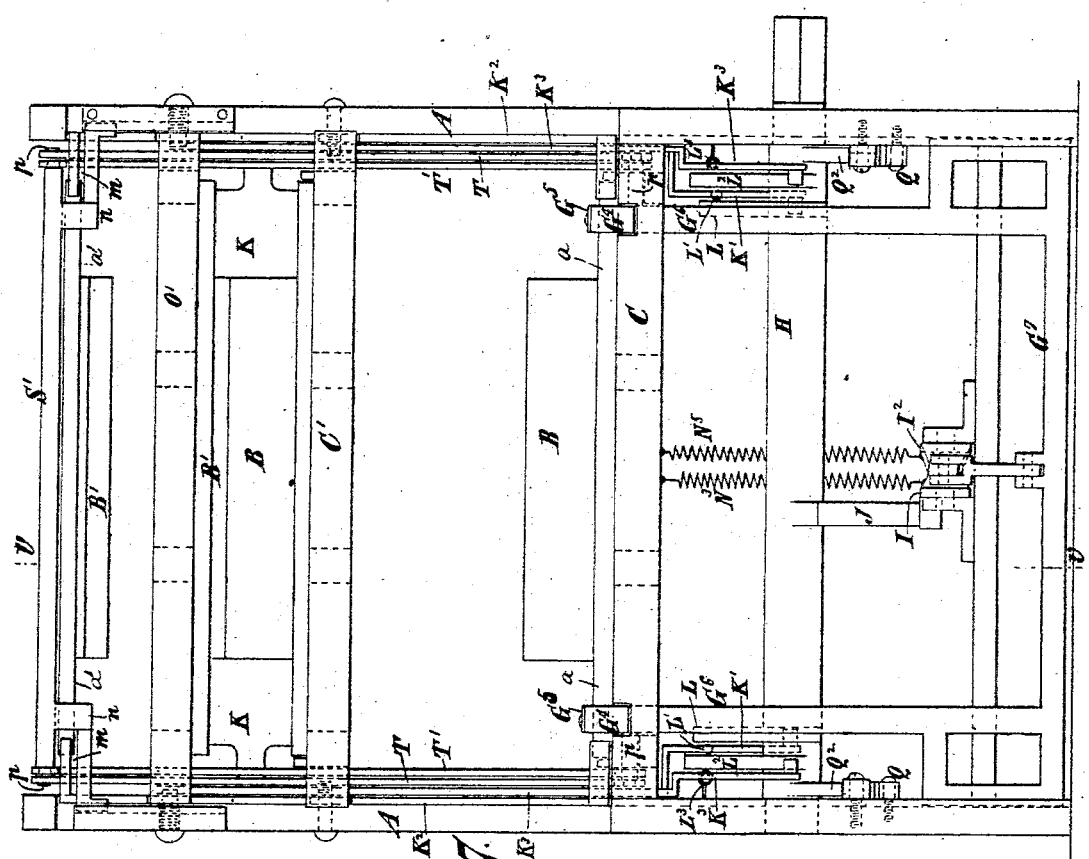
Witnesses
Edward T. Roche
James R. Bowen
Inventor
William J. Fox,
by his attorneys,
Gifford & Brown

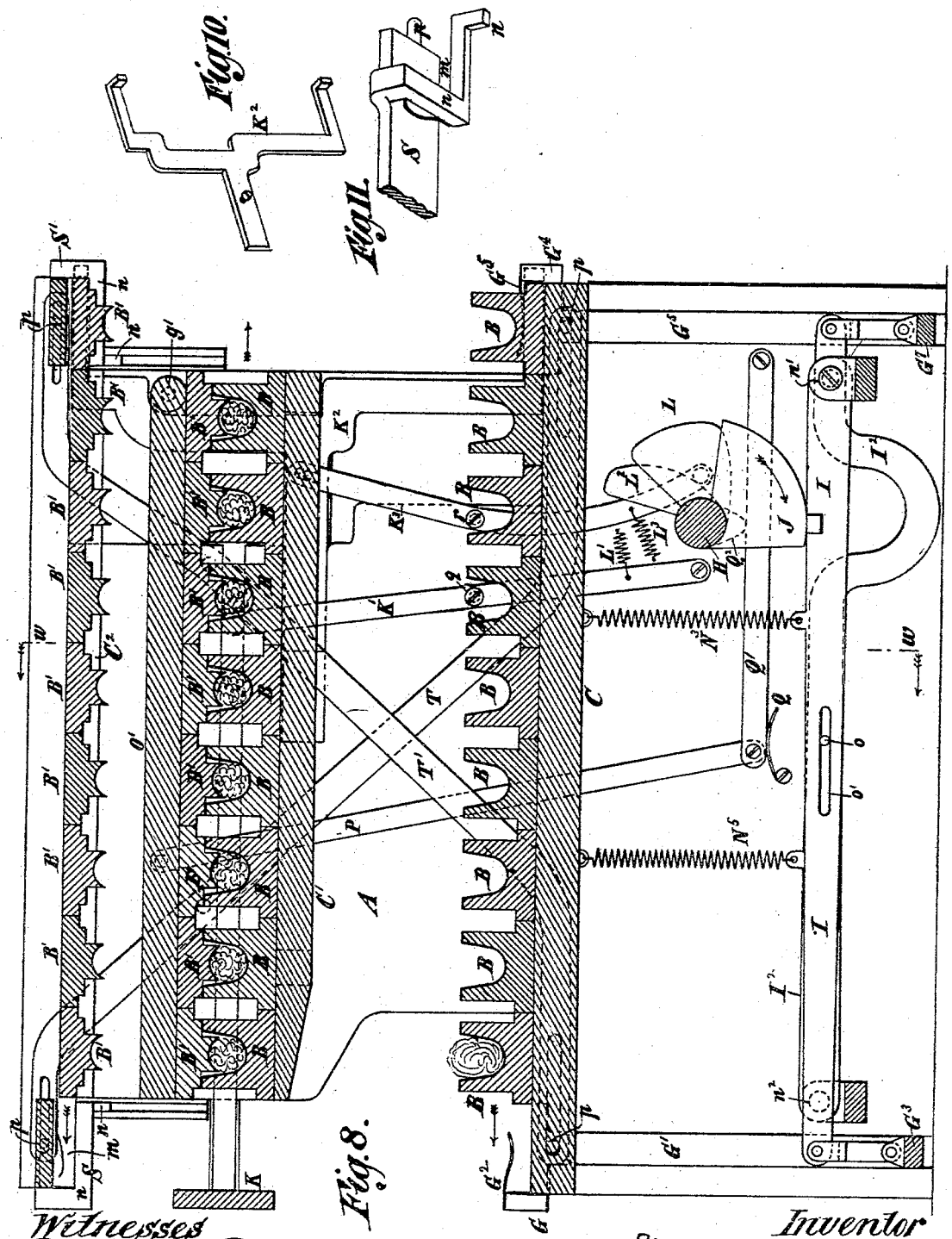

UNITED STATES PATENT OFFICE.

WILLIAM J. FOX, OF NEW YORK, N. Y.

MACHINE FOR MOLDING CIGARS.

SPECIFICATION forming part of Letters Patent No. 321,592, dated July 7, 1885.

Application filed October 15, 1884. (No model.)

*To all whom it may concern:*

Be it known that I, WILLIAM J. FOX, of New York, in the county and State of New York, have invented a certain new and useful Improvement in Cigar-Molding Machines, of which the following is a specification.

My improvement consists in various combinations of parts in a machine wherein a number of separate molds for cigar-bunches are successively opened, one at a time, to receive the bunches, and are then subjected to pressure and moved along to a point where they are opened to enable the bunches to be taken from them. Each mold is subjected to pressure until the operator desires to remove from it the bunch which it contains. This is of great importance, as I shall show more fully hereinafter.

Figure 1:
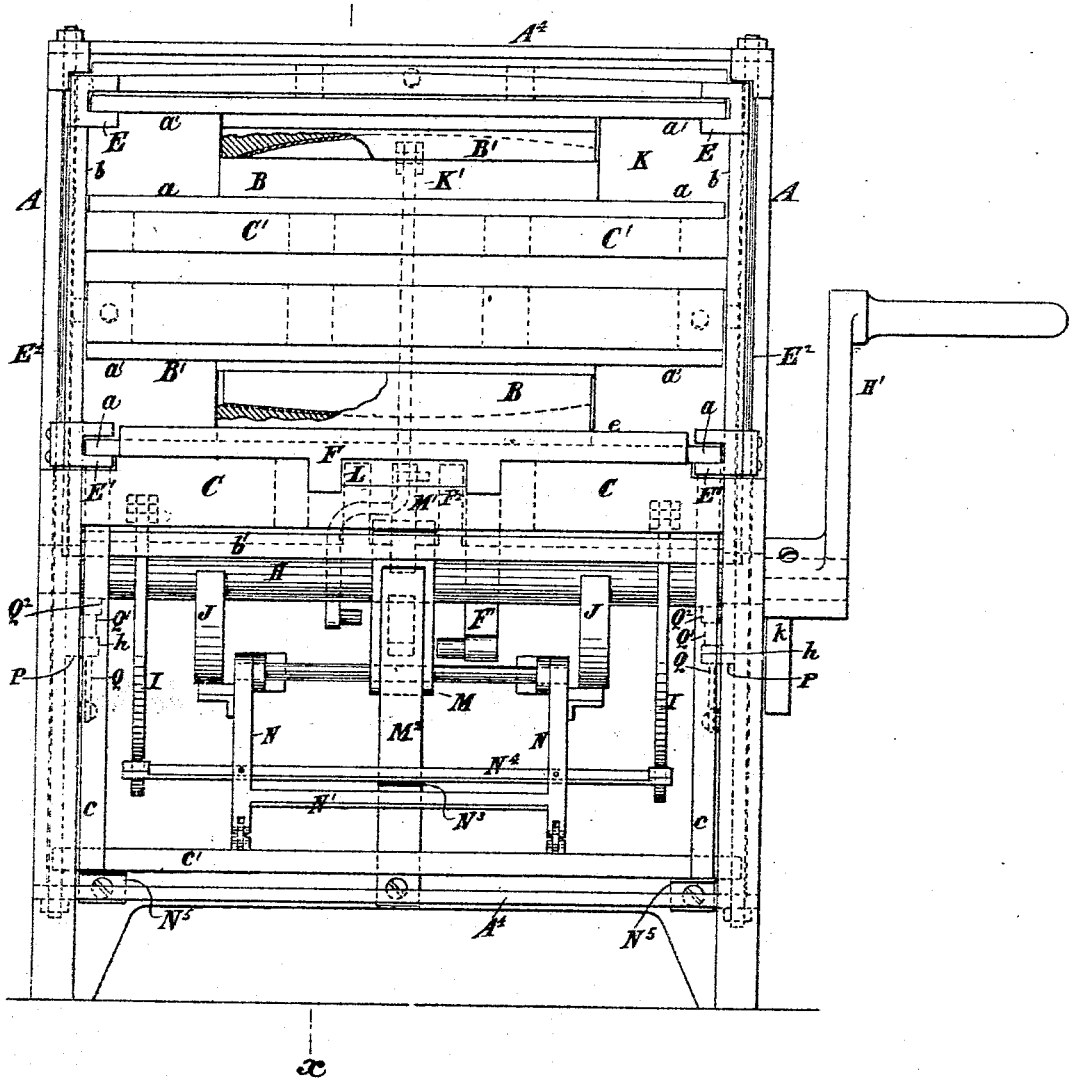
Figure 2:
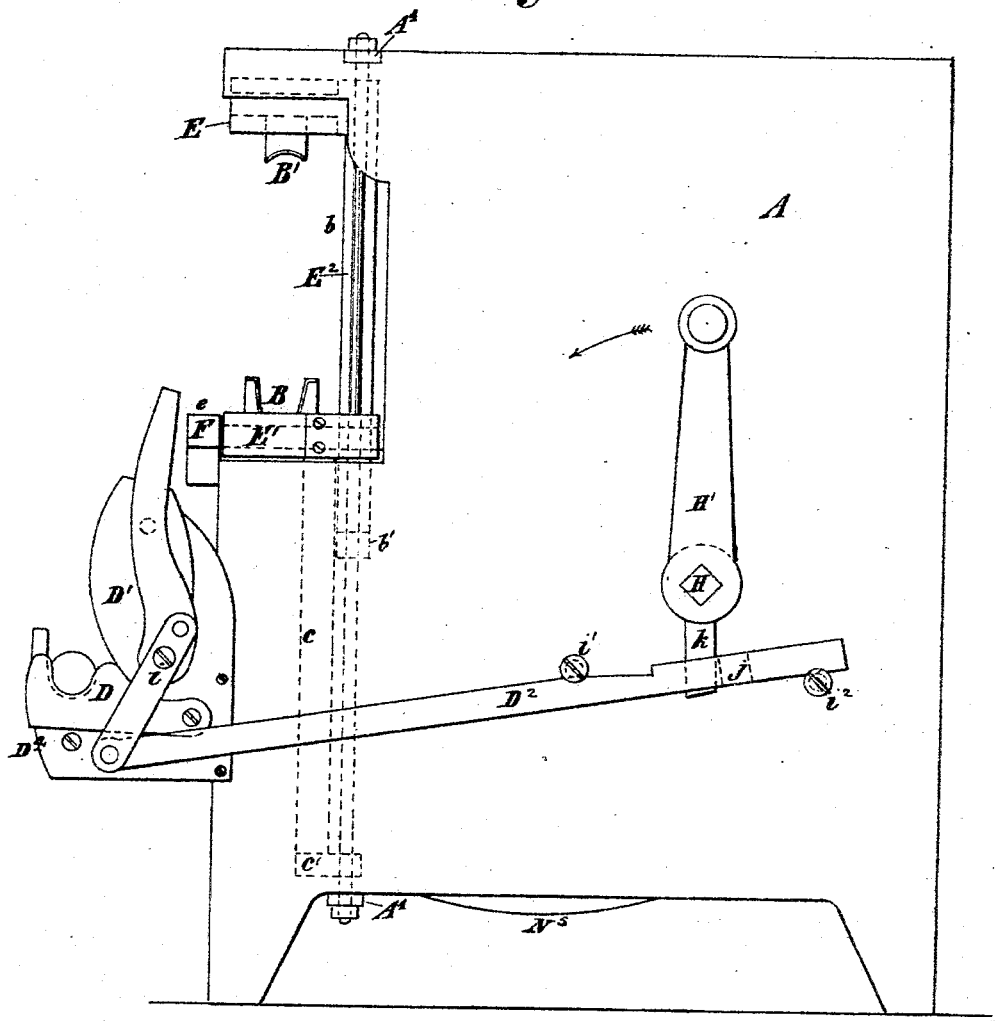
Figure 3:
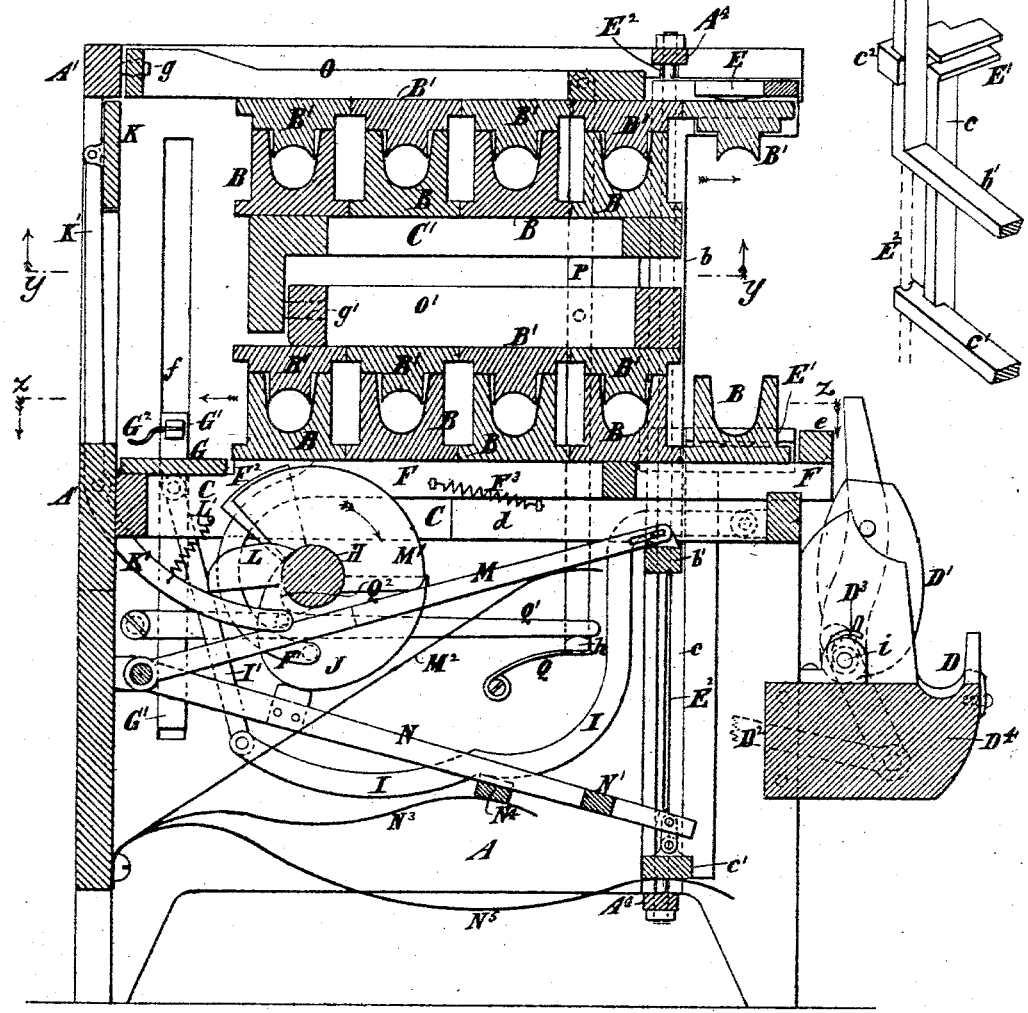
Figure 4:
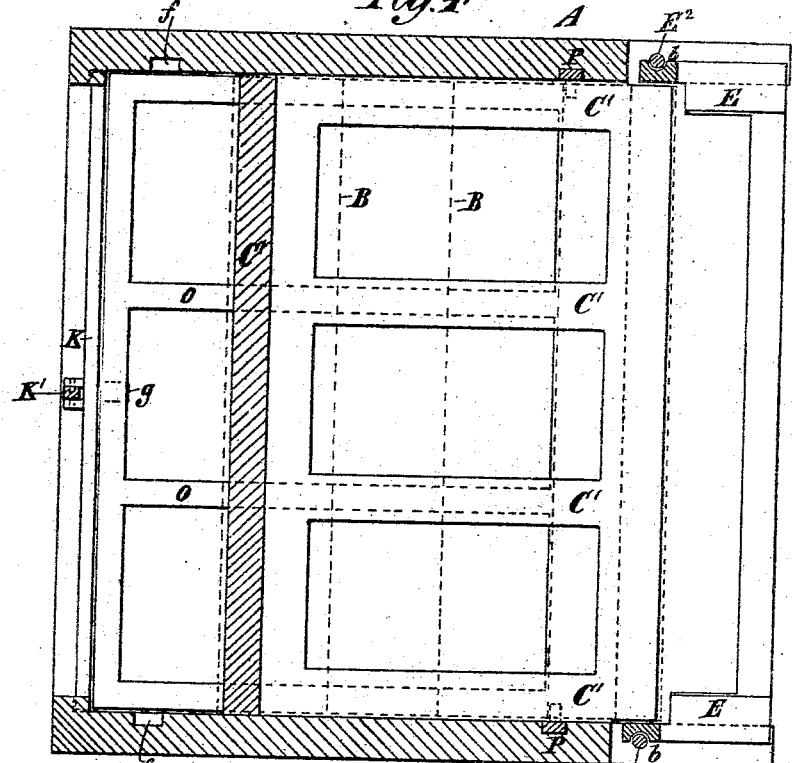
Figure 5:
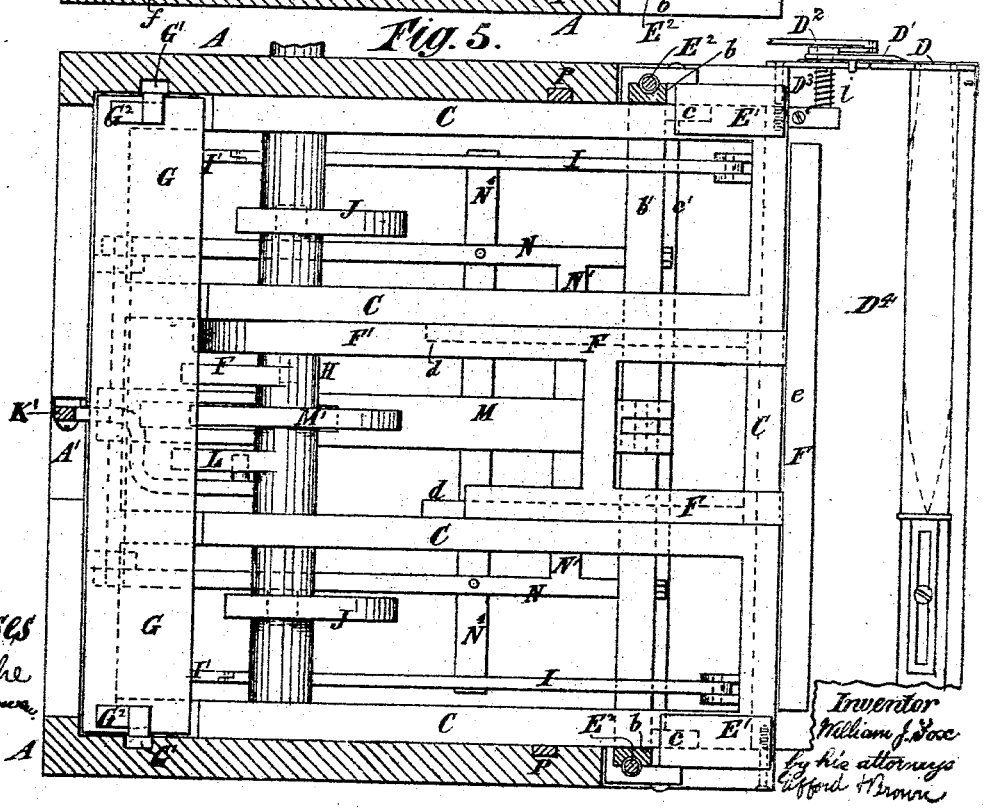

In the accompanying drawings, Figure 1 is a front view of a machine embodying my improvement; but certain parts are omitted to enable me to exhibit parts which otherwise would be hidden. Fig. 2 is a side view of the machine. Fig. 3 is a vertical section of the machine, taken in the plane indicated by the dotted line $x\ x$, Fig. 1, extending from the front to the rear of the machine. Fig. 4 is a horizontal section of the machine, taken at the plane of the dotted line $y\ y$, Fig. 3, and looking upward. Fig. 5 is a horizontal section of the machine, taken on the plane of the dotted line $z\ z$, Fig. 3, looking downward. Fig. 6 is a perspective sectional view of certain parts of the machine. Fig. 7 is an end view of a machine embodying my improvement in a modified form. Fig. 8 is a longitudinal vertical section taken on the plane of the dotted line $v\ v$, Fig. 7. Fig. 9 is a transverse vertical section of this machine, taken at the plane of the dotted line $w\ w$, Fig. 8. Fig. 10 is a perspective view of a certain part comprised in the machine shown in Figs. 7, 8, and 9; and Fig. 11 is a perspective view of certain parts comprised in this machine.
Similar letters of reference designate corresponding parts in all the figures.

I will describe the form of machine shown in Figs. 1, 2, 3, 4, 5, and 6. The frame of the machine may be of any suitable construction.
As shown, it consists, essentially, of two side pieces, A, and connecting cross-pieces $A'\ A^4$. These parts may be made of iron or other material.

B B' designate a number of molds, which may be made of wood, and severally consist of a bottom section, B, and a separable top section, B'. The bottom section of each mold has flanges $a$ at the ends, and the top section, B', has similar flanges, $a'$, at the ends. The body portion of the top section of each mold enters the body portion of the bottom section. The molds B B' in this example of my improvement are arranged in two tiers. Those in the lower tier rest upon a frame, C, (here shown as of rectangular form,) and their ends extend over the longitudinal bars of this frame. The molds in the upper tier are supported by a frame, C', which is similar to the frame C. The ends of these molds, which are in the upper tier, lap over the longitudinal bars of the frame C'. The frames C' C are supported by the side pieces of the frame, to which they may be secured by screws, bolts, or other suitable means.

In the operation of this machine the molds have their top sections separated from the bottom sections at the front of the machine, one at a time. When a mold is thus opened, any cigar-bunch contained in it is removed and is then ready to have a wrapper applied to it.
When the wrapper is applied to complete the cigar, the cigar is rolled. A fresh cigar-bunch is then inserted in the mold, and then the top section is lowered upon the bottom section. This mold and all others in the lower tier behind it are then moved backward a distance equal to the width of one mold. The rearmost mold of the lower tier is then moved up into line with those in the upper tier. Then the foremost mold in the upper tier is moved forward off the supporting-frame C', and is opened by lowering the bottom section onto the frame C. While the molds are thus disposed, pressure is applied to all of them except the one which is open. While the foremost mold is open, the pressed cigar-bunch which it contained is removed, wrapped, and rolled, and a fresh bunch is inserted in its place. The operation is then repeated.

It will be obvious that all the molds except the foremost are subjected to pressure while the operator is removing from the foremost the bunch it contained and inserting a fresh bunch. I preferably employ a cutter, D D', and operate it so that it will cut a finished cigar to the standard length while the molds are being adjusted, as explained.

Having now given a general idea of the nature and operation of the machine, I will describe the various combinations of parts which are involved in it.

In beginning the description of the various combinations of parts I will assume that the foremost mold has been lowered into the lower tier. It will then be supported in jaws E E', by which it was previously opened, and transferred from the upper tier to the lower tier. These jaws E E' slide up and down along guides consisting of rods $E^2$ bolted to the cross-pieces $A^4$ of the frame. The jaws E are opposite each other and arranged in the same horizontal frame. They are connected to bars $b$, having grooves in their outer sides fitting the rods $E^2$. These bars are united at the lower end by a cross-bar, $b'$. The jaws E' are also opposite each other and in one horizontal plane. They are connected to bars $c$, which are united at the lower end by a cross-bar, $c'$, having grooves in their ends fitting the rods $E^2$. From the jaws E' extend clips $c^2$, which embrace the bars $b$ of the jaws E.

The jaws E, their bars $b$, and the cross-bar $b'$ may be made in one metal casting, and the jaws E', their bars $c$, and the cross-bar $c'$ may be made in another metal casting. The end flanges of each mold in turn are slid into horizontal grooves in the jaws E E'.

The means for operating these jaws will be described hereinafter.

Assuming that the foremost mold has had a cigar-bunch inserted in it, and that it has been closed and is located in the lower tier, I will now describe the means whereby it is moved rearward. When it occupies the position just mentioned, it is over a carriage, F, sliding horizontally upon shoulders $d$ on the frame C. A bar, $e$, projecting upward from the front of this carriage, impinges against the front of the middle portion of the bottom section of the foremost mold. This bar is not as long as the distance between the adjacent sides of the jaws E'; hence it can pass between these jaws. When the carriage moves rearwardly, the bar $e$ pushes the foremost mold rearwardly a distance equal to its width. The foremost mold in this movement pushes all the molds that are in the lower tier behind it the same distance which it is moved. The rearmost mold in the lower tier is thus moved off the frame C and onto the platform G of an elevator. The carriage F has at the rear a curved tail-piece, F'. A cam, $F^2$, upon a rotary shaft, H, operates upon the tail-piece F' and moves the carriage F rearwardly. A spring, $F^3$, connected to the carriage and to the frame C, moves the carriage forward to its normal position. In making the forward movement the carriage does not affect the molds. The shaft H is shown as provided at one end with a crank, H', whereby it may be rotated. The platform G of the elevator has extending from it bars G', which work in slideways $f$ in the side pieces, A, of the main frame of the machine. The bars G' of the elevator are provided with spring-fingers $G^2$, which, when the rearmost mold of the lower tier is forced upon the elevator-platform, impinge upon the end flanges of the bottom section of the said mold, thereby holding the mold upon the platform. The elevator-platform is raised by levers I, fulcrumed to the front bar of the frame C, and connected by links I' with the elevator-platform. These levers I, which raise the elevator-platform, derive their motion from the action of cams J, mounted on the shaft H, as I shall fully explain hereinafter. When the levers I are relieved from the action of the cam, the elevator-platform descends by reason of its gravity and the gravity of the said levers I and the links I'. When the elevator-platform is raised to its highest position, it carries the mold which happens to be upon it into line with the molds which are in the upper tier. The elevator-platform, after being raised to this position, dwells there for a time, owing to the cams J, from which it derives motion, having a portion which is concentric with the shaft H, on which they are mounted. While the elevator-platform dwells in its raised position the mold which it bears is pushed forward off it onto the frame C'. This operation is performed by a push-piece, K, which is made in the shape of a bar adapted to bear against the rear side of the mold and pivotally connected to a lever, K'. The lever K' is fulcrumed to the cross-piece A' of the main frame of the machine, and oscillated in one direction by a cam, L, mounted on the shaft H, and in the other direction by a spring, L'. Each mold which is pushed off the elevator-platform onto the frame C' is moved a distance equal to its width. In making this movement it causes all the molds in the upper tier to move a distance equal to the width of a mold. Owing to this, the foremost mold of the upper tier is moved forward so that its end flanges will enter the grooves in the jaws E E', the latter having previously been both raised into the proper position to receive them. The jaws E E', as here shown, are raised by springs and lowered by levers actuated by cams. The cross-bar $b'$ belonging to the jaws E has connected to it a lever, M, which is depressed by a cam, M', mounted on the shaft H, for the purpose of drawing the said jaws down. When this cam M' releases the lever M, the latter is impelled upward by a spring, $M^2$, and then elevates the said jaws E. The cross-bar $c'$ belonging to the jaws E' is connected to levers N. These levers are rigidly connected together by a cross-bar, N'. They impinge against the cams J, which are mounted on the shaft H. When the cams J act on these levers N, the latter are depressed and they lower the jaws E'. When the levers are released from the cams J, a spring, $N^3$, acting upon a cross-bar, $N^4$, which is connected to the levers, operates to raise the levers and the jaws E'. I have shown springs $N^5$ impinging against the cross-bar $c'$ belonging to the jaws E', for the purpose of aiding the spring $N^3$ in raising these jaws and the levers which are connected to their cross-bar $c'$. The cross-bar $N^4$, connected to the levers N, extends under the levers I, by which the elevator-platform G is elevated, and hence the cams J, by depressing the levers N, also allow the levers I to descend. When the levers N rise, they also raise the levers I. Immediately after the foremost mold has been pushed into the jaws E E' the cams J operate to depress the levers N, and consequently to lower the jaws E'. The bottom section of the foremost mold will thus be separated from the top section of such mold and lowered to the level of the bottom sections of the molds in the lower tier, while the top section of said foremost mold will be left on a level with the top sections of the molds in the upper tier.

O O' designate pressure-frames, which are hung at the rear ends upon pins $g$ $g'$, extending, respectively, from the cross-bar A' of the main frame of the machine and from the frame C'. These frames can be swung up and down upon the pins $g$ $g'$ as fulcrums. Near the forward ends these frames have pivotally connected to them rods P, which fit in slideways in the side pieces of the main frame of the machine, and have at the lower ends laterally-extending lugs $h$. Springs Q, fastened to the side pieces of the main frame of the machine and impinging against the under side of the lugs $h$, raise the rods P, and consequently the pressure-frames O O', so as to relieve the molds from pressure and permit them to be moved along. Levers Q', fulcrumed to the side pieces of the main frame of the machine, impinge upon the upper sides of the lugs $h$, and when depressed by cams $Q^2$, which are mounted upon the shaft H, pull down the rods P, and thereby forcibly draw down the pressure-frames O O' upon the molds. The pressure-frames are forced down upon the molds at the same time that the jaws E' carry down the bottom section of the foremost mold. The machine is now in a state of rest, so that the operator can remove the pressed cigar-bunch from the open foremost mold, wrap it and roll it, and insert a fresh bunch in the mold.

All the operations described are accomplished with a single rotation of the shaft H. The first movement of the shaft after the insertion of a fresh bunch into the open foremost mold causes the jaws E to descend, so as to lower the top section of this mold upon the bottom section thereof and to bring it to a level with the top sections of the molds in the lower tier. The succeeding movement of the shaft during this next rotation causes a repetition of the movements which I have previously described.

The cutter D D' consists of a stationary knife, D, and a movable knife, D'. The stationary knife D is affixed to one end of a trough-like holder, $D^4$, in which a cigar may be laid with its pointed end against a gage, which is adjustable to suit different standard lengths of cigars, and its blunt end projecting past the stationary knife. The movable knife is supported upon a fulcrum, $i$, so that its sharp edge may swing past the adjacent edge of the stationary knife. A portion of the movable knife, extending past the fulcrum, is pivotally connected to a rod, $D^2$, which slides between studs $i'$ $i^2$, and is provided with a laterally-extending lug, $j$. A toe, $k$, extending from the shaft H, operates upon this lug $j$, when the shaft is rotated, so as to pull the rod $D^2$ rearward and cause the movable knife to descend and cut off the portion of the cigar projecting beyond the stationary knife. The toe $k$, after having done this work, passes beyond the lug $j$ and releases the rod $D^2$, whereupon a spring, $D^3$, raises the movable knife to its normal position. The operator is to place each finished cigar in the trough-like holder $D^4$ when he inserts a fresh cigar-bunch in the foremost mold, and then the finished cigar will be cut at the same time the top of the foremost mold is brought down upon the bottom section thereof. The movable knife D' may be operated by the hand of the operator at any time, if desirable.

I will now explain the machine shown in Figs. 7, 8, 9, 10, and 11. The frame of this machine is substantially like the one before described. The molds B B' are like those which I have already described. For this machine there are to be two attendants, who will occupy positions at the ends. The bottom and top sections of the molds are separated at one end of the machine, and their sections travel along while separated to the other end of the machine. Here they have bunches inserted in them. After the insertion of bunches into them they are closed, and while closed they travel along to the rear end of the machine, where they are separated. Then the pressed bunches are withdrawn and wrappers are applied and rolled on. There are always two series of molds in this machine, as in the other; but in this machine one set have their sections closed, and the other set have their sections separated, and the upper sections of the latter travel above and their lower sections below the set of molds which have their sections closed.

With this preliminary explanation I will proceed to a detailed description. The set of molds which are closed are supported by and travel along a frame, C'. The bottom sections of the molds of the other set are supported by and travel along a frame, C. They are guided by lips or ribs $l$, projecting upward from the frame C. The top sections of the last-mentioned molds have their end flanges supported by rails $C^2$. They travel along these rails and are guided by lips or ribs $l'$, projecting upward from these rails.

At the front end of the machine is a carrier, S, having two grooves, $m$, one being arranged on each side of the machine. These grooves $m$ are in the same horizontal plane.

One end of this carrier is very clearly shown in Fig. 11. Both ends are similarly constructed. It will be seen that the grooves are formed by bending bars $n$ down and back under the main bar of the carrier. The end of these bars $n$ are bent outward and downward and enter vertical grooves formed in the inner surfaces of the side pieces of the main frame of the machine. The carrier S is capable of moving up into a position where its grooves $m$ will be in line with the end flanges of the top sections of the set of molds which have their top sections separated from their bottom sections, so that the one of these top sections which is nearest to the carrier can be pushed forward to cause its end flanges to enter the grooves of the carrier. The carrier can then be lowered to carry the top section, which is engaged with its grooves, down to a level with the set of molds which have their top and bottom sections fitted together.

G designates an elevator, which is capable of being lowered to such position that its upper surface will be coincident with the upper surface of the frame C, and of being raised to such position that its upper surface will be coincident with the upper surface of the frame C'. The elevator G is provided with bars G', fitting within grooves in the inner surfaces of the side pieces of the main frame of the machine. The elevator-platform G is provided with spring-fingers $G^2$, whereby the end flanges of the bottom section of a mold moved onto the elevator will be held there against accidental displacement. Between the bars G' of the elevator a cross-bar, $G^3$, extends. This bar $G^3$ has connected to it a lever, I. The lever I is supported by a fulcrum, $n'$, and is depressed by a cam, J, mounted on a shaft, H, for the purpose of lowering the elevator. A spring, $N^3$, fastened at one end to the lever I and at the other end to the frame C, raises the said lever and thereby raises the elevator whenever the cam J releases the lever.

At the rear end of the machine there is a carrier, S', which in construction and operation is like the carrier S. Its component parts are similarly lettered. It is intended to receive the top section of the rearmost mold, having its top section fitted to its bottom section, and then to separate the same from the bottom section and raise the same to the level of the top sections of the molds that have the top sections separated from the bottom sections.

At the rear end of the machine is an elevator, $G^4$, constructed like the elevator G, and operating similarly. This elevator $G^4$ is furnished with spring-fingers $G^5$, like the spring-fingers $G^2$, heretofore described. From the elevator $G^4$ extend downwardly bars $G^6$, working in grooves in the side pieces of the main frame of the machine, and connected by a cross-bar, $G^7$. A lever, $I^2$, supported by a fulcrum, $n^2$, is connected to the cross-bar $G^7$. A pin, $o$, extending laterally from the lever I, enters a slot, $o'$, in the lever $I^2$; hence when the lever I is depressed by the cam J the lever $I^2$ will be similarly depressed. A spring, $N^5$, fastened at one end to the lever $I^2$ and at the other end to the frame C, aids in raising the levers I $I^2$ whenever the cam J releases them. A lever, T, extends between the carrier S and the elevator $G^4$, and a lever, T', extends between the elevator G and the carrier S'. These levers are slotted near the ends to receive pins $p$, extending laterally from the elevator and carriers, so as to allow of their play through arcs of circles. When the elevators are raised by the levers I $I^2$, the carriers will, through the levers T T', be lowered, and, conversely, when the elevators are lowered the carriers will be raised. I will assume that the elevators have been raised and the carriers have been lowered. The elevator G and the carrier S will then be ready to deliver the bottom and top section of a mold, and the elevator $G^4$ and carrier S' will be ready to receive the bottom and top section of a mold. When the parts are in this position, the bottom mold-section on the elevator G will have received a cigar-bunch, and it and the corresponding top mold-section will have been brought together. While the parts are thus disposed, a push-piece, K, is moved rearward and forces the mold-sections from the elevator G and carrier S onto the frame C'. All the molds on this frame C' will, by this operation, be moved a distance equal to the width of one mold, and the rearmost mold will have its bottom section forced onto the elevator $G^4$, and its top section forced into the carrier S'. After this has been done, the elevators descend and the carriers rise. The pressed cigar-bunch contained in the bottom section of a mold supported by the elevator G' will now be removed, rolled, and wrapped. The elevator $G^4$ and the carrier S' will then be ready to deliver the bottom and top sections of the mold which they support, and the elevator G and carrier S will be ready to receive the bottom and top sections of a mold. A cigar-bunch will now be placed in the bottom section of the foremost mold. At this time the push-pieces $K^2$ move forward and push the mold-sections, which are supported by the elevator $G^4$ and carrier S', forward a distance equal to their width. The top sections of molds supported by the rails $C^2$ will all be moved correspondingly forward, and the foremost mold will have its top section forced into the carrier S and its bottom section forced onto the elevator G, so as to be ready for another cigar-bunch. The push-piece K has affixed to it two slider-bars, which work in horizontal grooves in the side pieces of the main frame of the machine. Its slider-bars have levers K' pivotally connected to them. These levers are fulcrumed at $q$ to the side pieces of the main frame of the machine, below the points where they are connected to the slider-bars, and at their lower ends they are actuated by cams L on the shaft H, so that their upper ends will move the push-piece rearward. When the cams L release the levers K', springs L', connected to the said levers and to the side pieces of the main frame of the machine, force the push-piece forward. The push-pieces K² work in recesses formed in the inner surfaces of the side pieces of the main frame of the machine. They have diverging arms, whose ends project inwardly so as to be capable of abutting against the mold-sections supported by the elevator G and carrier S when the said elevator is raised and the said carrier is lowered. These push-pieces K² are similarly constructed. One is clearly illustrated in Fig. 10. Levers K³, fulcrumed at r between their ends to the side pieces of the main frame of the machine, are at the upper ends pivotally connected to these push-pieces K², and at their lower ends are actuated by cams L² on the shaft H, so as to force the push-pieces K² forward. Springs L³, connected to the levers K³ and to the side pieces of the main frame of the machine, move the levers in the reverse direction when permitted by the cams L², and consequently move the push-pieces K² rearward. Above the molds, which are located upon the frame C', is a pressure-bar O'. This is pivotally connected at or near one end to a pin, g', and is pivotally connected to links or rods P, which extend from it to levers Q'. The levers Q' are actuated to draw the pressure-bar O' downward by cams Q² on the shaft H. Springs Q raise these levers, and consequently the pressure-bar, whenever the cam permits them to do so. The pressure-bar is drawn down when the elevator-platforms G G' are lowered and the carriers S S' are raised. The shaft H may be rotated by a hand-crank or otherwise.

At the rear of the machine I intend to employ a cutter like the one comprised in the machine first described.

Obviously the jaws E E' in the machine first described and the elevators and carriers in the other machine constitute mold openers and closers; that the push-pieces in such machines constitute propellers for moving the molds along, and that the pressure-bars constitute pressers.

By the use of one of my machines great uniformity in the manufacture of cigar-bunches, and consequently of cigars, may be attained. Owing to the perfection of the bunches which it is possible to attain with the use of such machine, the minimum quantity of tobacco for the wrapper may always be employed, and hence a saving in this respect.

Labor is saved in making cigars with the machine, because the operation of the machine may be effected by the act necessary to trim off the end of the cigars with the cutter.

A saving of space and expense results from the use of the machine as compared with large blocks of molds and presses.

In consequence of the exactness with which my machine will operate on the molds, the latter will be more than ordinarily durable. As each bunch is kept pressed by my machine until the operator wants to use it, the shape given it by the mold will be preserved.

The work done with the machine will closely approximate hand-work.

What I claim as my invention, and desire to secure by Letters Patent, is—

1. In a machine for pressing cigar-bunches, the combination of a series of molds, a propeller for moving the molds along, a mold opener and closer, and a presser independent of the propeller and the mold opener and closer exerting pressure on the molds after they are closed to keep them under pressure, substantially as specified.

2. In a machine for pressing cigar-bunches, the combination, with mold-supports, of mold-sections having cavities extending lengthwise of them between the ends, and having flanges at the ends adapted to be received by said supports and sustained thereby, a propeller for moving the mold-sections along in a direction transverse to their length, a mold opener and closer, and a presser independent of the propeller and the mold opener and closer exerting pressure on the molds after they are closed to keep them under pressure, substantially as specified.

WM. J. FOX.

Witnesses:
T. J. KEANE,
WM. G. LIPSEY.